United States Patent [19]
Bringman

[11] 3,718,345
[45] Feb. 27, 1973

[54] STABILIZING APPARATUS

[76] Inventor: Robert D. Bringman, 18600 Burbank Boulevard, Apt. 204, Tarzana, Calif. 91356

[22] Filed: Dec. 28, 1970

[21] Appl. No.: 101,689

[52] U.S. Cl. ............... 280/289, 280/213, 280/293, 280/301, 180/1 FV, 244/64, 248/291
[51] Int. Cl. ............................................. B62h 7/00
[58] Field of Search......280/289, 213, 293, 295, 296, 280/301; 296/1 S; 180/1 FV; 244/64

[56] References Cited

UNITED STATES PATENTS

| 2,036,560 | 4/1936 | Backus | 296/1 S |
|---|---|---|---|
| 3,610,660 | 10/1971 | Price | 280/289 |
| 2,788,763 | 4/1957 | Ries | 280/289 UX |
| 1,556,902 | 10/1925 | Beville et al. | 248/291 |
| 1,445,953 | 2/1923 | Illgen | 180/1 FV |
| 3,000,663 | 9/1961 | Lucchesi | 296/1 S |
| 1,717,515 | 6/1929 | Linton | 180/1 FV |
| 3,545,790 | 12/1970 | Davis et al. | 280/289 |

Primary Examiner—Leo Friaglia
Assistant Examiner—John P. Silverstrim
Attorney—Littlepage, Quaintance, Wray & Aisenberg

[57] ABSTRACT

Stabilizing apparatus for the front end of a motorcycle has a pair of forwardly declining fins adjustably attached to the front forks. In another embodiment, a single fin is supported over and spaced from the front wheel. Pressure of relative wind on the fins produces downward force on the forks which tends to hold down the front end of a motorcycle.

15 Claims, 6 Drawing Figures

PATENTED FEB 27 1973
3,718,345
SHEET 1 OF 2
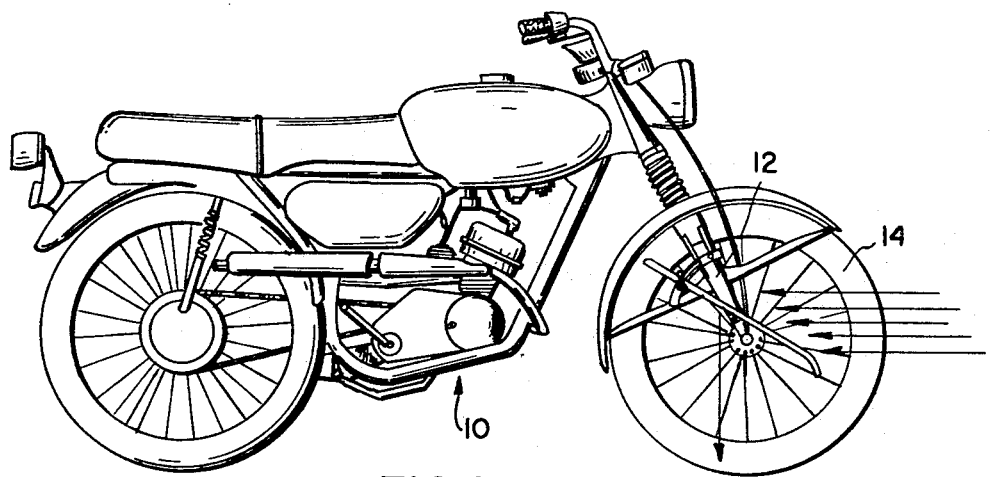
FIG. 1
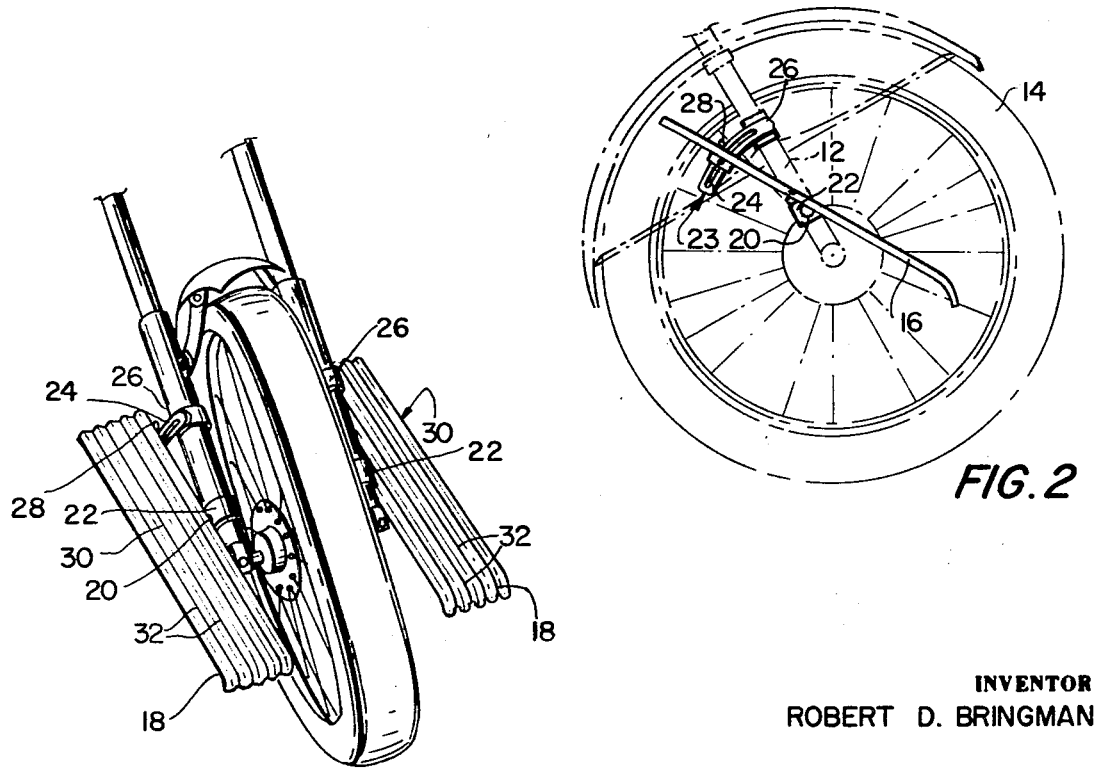
FIG. 2
FIG. 3
INVENTOR
ROBERT D. BRINGMAN
BY *James C. Wray*
ATTORNEY

PATENTED FEB 27 1973

INVENTOR
ROBERT D. BRINGMAN

BY *James C. Wray*

ATTORNEY

STABILIZING APPARATUS

BACKGROUND OF THE INVENTION

Recent years have seen a tremendous growth in the popularity and number of two-wheeled motor vehicles, particularly motorcycles. The increased number of such vehicles has not been confined to racing and competition events, but extends to general street and pleasure use as well.

Motorcycles have an inherent problem of stability if one of the wheels leaves the ground. This problem becomes especially acute when the front wheel rises. In such case, not only stability is reduced, but also steering capability is reduced.

Many factors influence the stability of a motorcycle. These factors may be human, such as the experience and skill of the operator, and technical, such as the propensity of the front end to lift. For a skilled driver, front end lift at low speeds can be tolerated. At high speeds, front end lift becomes dangerous, even to a skilled operator.

The propensity of the front end to lift may be due to a number of effects. A rapidly accelerating motorcycle produces a torque about the rear axle which tends to lift the front end. Often, this torque may cause the front end to raise in the air.

One of the principal causes of front wheel lift lies in the basic law of force that every action has an equal and opposite reaction. The torque which turns the rear wheel forward about the rear axle in driving a motorcycle is balanced by an opposite torque which tends to turn the motor cycle and driver rearwardly about the rear axle. Usually the forward moment of the motorcycle and driver is sufficient to overcome the rearward torque. But, when the motorcycle is driven forward, the rearward torque always acts to reduce the downward force on the front wheel produced by the combined weights of the machine and driver. Rapid accelerations tend to displace the driver rearward, reducing his forward moment and downward force on the front wheel. At the same time, the high torque which produces the acceleration, produces a greater lifting force on the front wheel. At low speeds, for example upon starting, such occurences may be tolerated. At high speeds, lifting of the front wheel is extremely dangerous.

The forward leaning operator on a high speed motorcycle may induce the front end to lift. The aerodynamic shape of the operator's body may deflect wind pressure and produce a force which has a vertical lift component. High speed wind resistance forces the driver rearward reducing his downward force on the front wheel. The planing action between the wheel and ground and the aerodynamic forces on motorcycle parts magnified by the well known aerodynamic surface effects produce front wheel lifting forces. These propensities of the motorcycle front wheel are increased by high speeds.

Thus, at high speeds, shortened operator response time and possible lift forces may impair the stability of a motorcycle.

Air foils have been known for automobiles, particularly high speed racers. Known foils may be divided into two categories, those that are mounted at the rear of a vehicle to provide increased braking and acceleration friction on the rear wheels; those mounted at the sides of vehicles for example at quadrants. The former are usually unitary. Known foils of the latter type have zero angle of attack on straightaways and are positively inclined on one side when turning to prevent sway and to maintain levelness of the vehicle. For example, when making a turn to the right, foils on the left are given a positive angle of attack to lift the left side and to prevent it from dipping. Prior art devices are used to hold down rear wheels or to lift sides. No prior art devices are known which are designed to overcome the long standing floating or planing problem of high speed front end lift and steering loss. The long standing problem remains.

SUMMARY OF THE INVENTION

The invention provides stabilizing apparatus which may be quickly and easily attached to a front end of a vehicle, particularly a motorcycle.

This device is a safety device designed to keep the front end of a motorcycle increasingly secured down to the street as the speed of the cycle increases. The wind pressure against two fin-shaped blades mounted on either side of the front end of the motorcycle forks, angled at approximately 45° from the horizontal but adjustable in either direction, depresses the front of the motorcycle down to increase front wheel traction, thus avoiding high speed "flotation" of the front end of the motorcycle, and suppressing high speed wobbling and instability. This materially increases the safety of motorcycling.

The stabilizing apparatus has forwardly declining deflection means, typically fins, which transform the pressure of wind thereon to a vertical component producing a downward force on front wheels. Attachment means connect and hold the deflection means to the vehicle for transferring downward force from the deflection means to the vehicle.

In one preferred embodiment, fins are positioned on either side of the front wheel. In another preferred embodiment, a single fin is positioned over and spaced from the front wheel.

In preferred embodiments, adjustment means connect the attachment means and deflection means. The adjustment means allows variance of the angle of declination for permitting downward force to be increased or decreased per unit of pressure.

While the present invention has particular application to motorcycles, the scope of the invention allows attachment of the apparatus to other vehicles which may encounter similar problems in stability caused by high speed front wheel lift.

The object of the present invention is to provide simple and inexpensive means for increasing the front end stability of land vehicles, particularly wheeled vehicles, and especially motorcycles.

This object and other objects will become apparent from the foregoing and ongoing specification, the claims and the accompanying drawings.

BRIEF DESCRIPTION OF THE DRAWINGS

FIG. 1 is a side elevation of a motorcycle having the stabilizing apparatus.

FIG. 2 is a detail view of the front wheel assembly of FIG. 1 showing an enlargement of the stabilizing apparatus.

FIG. 3 is a perspective detail of the deflection means.

DETAILED DESCRIPTION OF THE DRAWINGS

Figure 4:
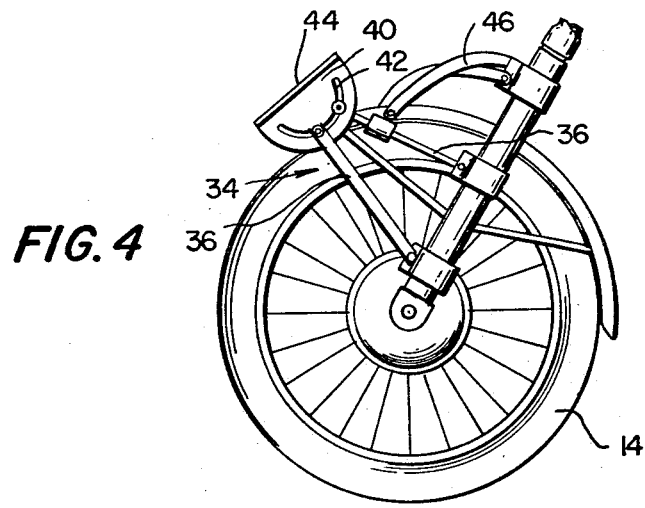
FIG. 4 is a side elevation of embodiment having a single fin located over and spaced from the front wheel.

Referring to FIG. 1, a motorcycle, generally indicated at 10, is shown having forwardly extending front forks 12 and front wheel 14.

Deflection means, such as forwardly declining fins 16 are mounted on forks 12, to use relative wind to produce a downward force on the front wheel.

As best shown in FIGS. 2 and 3, first and second forwardly declining fin means each have downward curved portions 18. Fins 16 are mounted on forks 12 by attachment means, including pivot means 20 and its mounting means 22, which is connected to fork 12. Adjustment means 23 include arcuate slides 24, centered about pivots 20, mountings 26, which attach the slides to forks 12 above the pivots, and lugs and nuts 28 which secure the fins at selected points along the slides.

Alternatively, the arcuate slot may be replaced by a series of detents or openings that engage or receive a laterally extending lug of bolt fixed to a fin.

The arcuate clamp may be replaced by a fixed mounting which holds the fin fixed at an angle within a predetermined angular range with respect to the ground. Angles of from 30° to 45° are desirable. Larger angles in the range are used with smaller fins, and vice versa. When a fixed mounting replaces the adjustable one, the pivot is replaced by a fixed mounting.

Preferably, the pivot 20 is connected to the fin forward of its center of pressure so that the relative wind tends to depress the rear portion of the fin. In some embodiments, the pivot means may be placed on the fork above the adjustable mounting.

In one embodiment, the arcuate mounting is replaced or augmented by a spring mounting which permits the fin to yield upon higher pressures of higher relative wind, caused by higher speeds. As the fins yield, the downward force on the wheel increases, although not as much as would be experienced by a rigid foil at high speeds. Drag forces also increase with speed, but the increase is not as great with spring mounted foils as with rigid foils.

Preferably, the forward portion of a flat or corrugated fin is curved downward to aid in aerodynamic flow over the fin and to reduce danger of impaling stationary objects. For safety, the rear edge may be beaded or turned downward on itself about a small radius to reduce sharp edges. The fin may be made of any flat or three dimension material or object having strength to hold its shape sufficiently to produce a downward component of force from the relative wind.

As described herein, deflection means, plates or fins mean any body or member with the capability to produce the downward force.

In FIG. 3, the second forwardly declining fin means are shown having elongated corrugated plates 30 which corrugations 32 running in the longitudinal direction. As apparent in FIG. 3, preferred embodiments have deflectors on both sides of a front wheel.

When moving at high speeds, several forces tend to lift the front wheel of a motorcycle. One of the most serious of these forces is planing, which is created by the fluid forces which are built up by air or water entrapped between the wheel and the ground, as the fast turning wheel draws the fluid downward beneath the wheel. The planing force which tends to prevent contact between the front wheel and the ground are hazardous at high speeds on dry pavements, and they are especially hazardous on wet pavements. A layer of water between the wheel and the ground destroys all steering control. Some other possible causes of wheel lifting forces have been identified previously as weight shift, relative wind-caused lift, and torque, which usually reaches a maximum value at high engine revolution, for example 6,000-7,000 revolutions per minute, which are normally associated with high speeds.

When the apparatus moves at high speeds, air or relative wind impinges upon the deflection means and creates pressure thereon. This pressure creates a force with a downward component which is useful in holding the front wheel down on the ground, when wind, planing, torque, weight shifting and other forces tend to lift the front wheel at high speeds.

Figure 5:
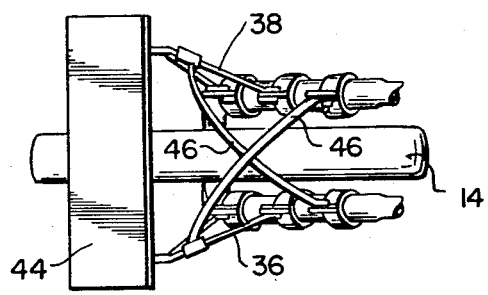
FIG. 5 is a top plan view of the embodiment shown in FIG. 4.
Figure 6:
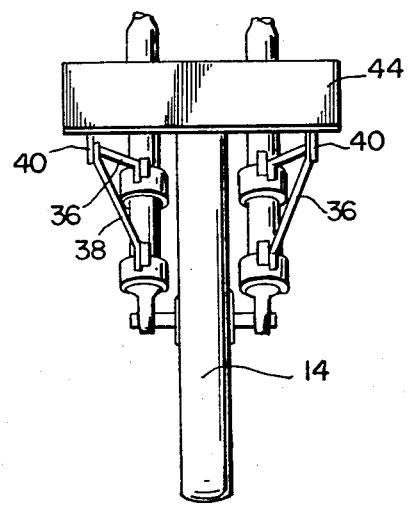
FIG. 6 is a front elevation of the embodiment of FIGS. 4 and 5, showing the single fin without the braces.

As best shown in FIGS. 4, 5 and 6, one embodiment has a single fin supported above the fender and forward of the front wheel axis by attachment means 34. The attachment means has strut means, such as struts 36 and 38 arranged in pairs on opposite sides of the front wheel. Two flange members 40, having interior arcuate slots 42, are fixed beneath fin 44. Fasteners pass through the arcuate slots 42 and cooperative portions of struts 36 and 38. Fasteners 46 may be tightened to secure flanges 40 to the struts. When fasteners 46 are loosened, fin 44 and flanges 40 may be moved to vary the declination of fin 44.

The embodiment as illustrated in FIGS. 4 and 5 has anti-sway means, such as cross braces 46, connected to struts 36 and 38 for restricting movement of the deflection means. Preferably, the braces are connected between a strut on one side of the wheel and the adjustment flange on the other side of the wheel. The anti-sway braces may be connected between struts on opposite sides of the wheel. Alternatively, braces are connected between the struts and the deflection plate at a distance from the struts.

In all cases the deflection means are positioned at angles which produce the most satisfactory relationship between downward force and drag at the most probable operating conditions. Motorcycles for highway use might have fins adjusted for planned speed of, for example 70 miles per hour. Racing motorcycles may have fins adjusted for higher speeds. Difference in adjustment need not be great, for wheel lifting forces tend to increase with speed at about the rates which are relative to the increases of downward force. In both lateral and overwheel fins, the angles of declination may be permanently set with rigid connections, or they may be adjustable in the manner shown, using slots and fasteners. Alternatively, one or more of the struts may be hinged to a fin, and adjustment may be made by sliding one of the attachments along a fork before tightening it in position.

While the invention has been particularly shown and described with reference to a preferred embodiment thereof, it will be understood by those skilled in the art that various changes in form and details may be made therein without departing from the spirit and scope of the invention.

What is claimed is:

1. Motorcycle stabilizing apparatus for a front end of a motorcycle having a frame, a rear wheel rotatably mounted at the rear of the frame, a fork rotatably mounted at the front of the frame, a front wheel mounted within the fork, comprising air deflection means for creating a downward force on the fork and the front wheel by the passage of air over the deflection means, said deflection means comprizing a forwardly declining fin means extending laterally outwardly a substantial distance from the longitudinal plane of said front wheel and attachment means connected to the air deflection means and adapted for being connected to the fork for holding the air deflection means on the fork and for transferring downward force from the deflection means to the fork and front wheel of the motorcycle.

2. Apparatus of claim 1 wherein the attachment means further comprises adjustment means connected to the deflection means and adapted for being connected to the fork for adjusting the deflection means with respect to the fork for varying downward force thereon.

3. Apparatus of claim 1 wherein the deflection means comprises a plurality of fins symmetrically positioned on opposite sides of a front wheel.

4. Apparatus of claim 1 wherein the deflection means comprises first and second forwardly declining fin means mounted on opposite sides of a front wheel.

5. The apparatus of claim 4 wherein the attachment means comprises inward projecting pivot means connected to the fin means at a lower forward portion thereof, the pivot means having mounting means adapted for connection to a lower forward portion of a wheel-mounting fork, and wherein the attachment means further comprises inward extending adjusting means having an arcuate portion centered around the pivot means and a locking portion for connecting to the arcuate portion and having mountings at inward termini of the adjustment means for attaching the adjustment means to portions of fork above the pivot means.

6. The stabilizing apparatus of claim 1 wherein the deflection means comprises a plate having a downward curve adjacent a forward portion thereof.

7. The apparatus of claim 1 wherein the stabilizing apparatus comprises an elongated corrugated plate having corrugations running in a longitudinal direction.

8. The apparatus of claim 7 wherein the corrugated plate has a downward curving portion adjacent a forward end thereof.

9. Apparatus of claim 1 wherein the attachment means further comprises strut means adapted to be connected to the fork and connected to air deflection means for holding the air deflection means in a position over and spaced from the front wheel of the motorcycle.

10. Apparatus of claim 9 wherein the strut means comprises cooperative pairs of first and second struts adapted for connection to the fork on opposite sides of the front wheel.

11. Apparatus of claim 10 further comprising adjustment means connected to the air deflection means and adjustably connected to distal ends of the cooperative pairs of first and second struts for adjusting the declination of the deflection means for varying the downward force thereon.

12. Apparatus of claim 9 further comprising anti-sway means connected to the strut means for restricting movement of the air deflection means.

13. Apparatus of claim 9 further comprising anti-sway means connected to the strut means and connected to the deflection means for restricting movement of the air deflection means.

14. Apparatus of claim 9 further comprising adjustment means connected to the deflection means and connected to the strut means for adjusting forward declination of the deflection means for varying downward force thereon.

15. Apparatus of claim 14 wherein the adjustment means further comprises a pair of flanges mounted on the deflection means, the flanges having arcuate interior slots therein for permitting fasteners to pass therethrough for adjustably fastening the deflection means to cooperative portions of distal ends of first and second struts.

* * * * *